April 6, 1943.    L. J. DE LANTY    2,315,943
MEANS FOR TESTING TUBES
Filed Nov. 2, 1940
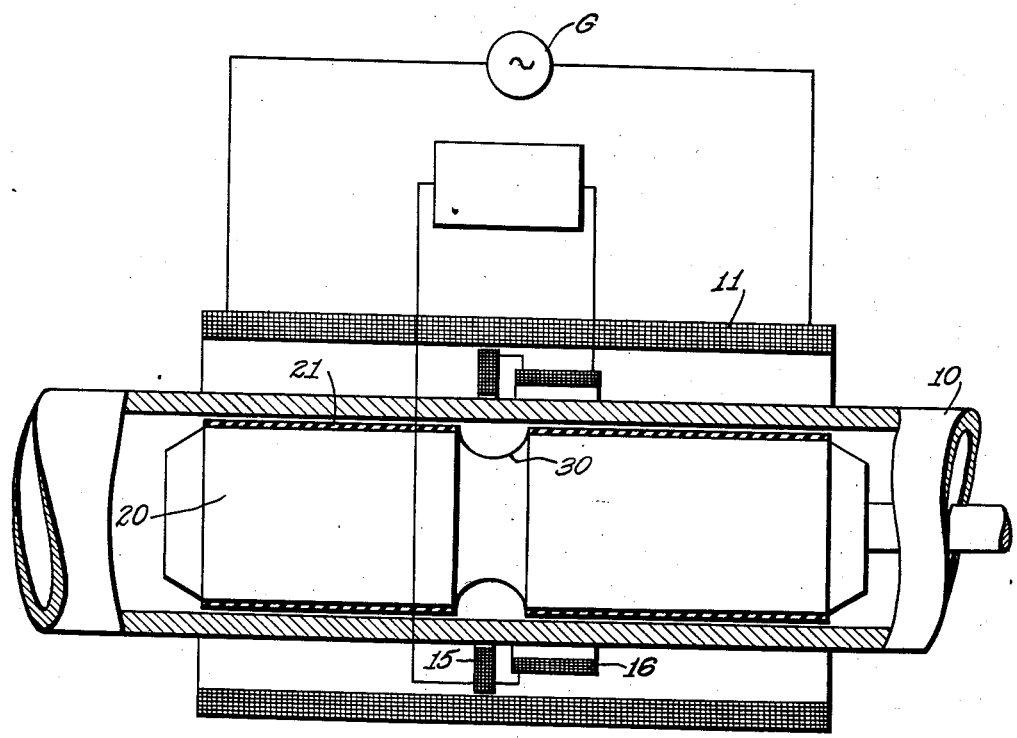
INVENTOR.
LOREN J. DE LANTY
BY Joseph H. Lipschutz
ATTORNEY Patented Apr. 6, 1943

2,315,943

UNITED STATES PATENT OFFICE 2,315,943

MEANS FOR TESTING TUBES

Loren J. De Lanty, Spring Valley, N. Y., assignor to Sperry Products, Inc., Hoboken, N. J., a corporation of New York Application November 2, 1940, Serial No. 363,986

2 Claims. (Cl. 175—183)

This invention relates to a method of and means for testing metallic tubes. More particularly, it relates to the method of tube testing wherein currents are induced circumferentially in the tube to be tested by means of an external exciting coil through which alternating current is being passed. The variations in the induced current within the tube under test caused by the presence of defects are detected by means of one or more detector coils cooperating with the circumference of the tube during relative movements of the tube and detector coils. The problem which presents itself in this type of testing relates to inducing the maximum flux in the tube under test from the exciter coil. Various methods of solving this problem have been proposed such as the obvious one of increasing the current through the exciter coil, but this results in increasing the extraneous flux, that is, the air circuit flux which is useless in detection, and necessitates the use of an excessive amount of current. Another method which has been proposed consists in placing the exciting coil inside the tube to be tested, but this is cumbersome by reason of the electrical connections which must be led to the coil and the necessity for maintaining accurate relative position of such an exciter relative to the tube and detector coils. By this invention I solve the problem in a novel way which is simple and effective and which permits the use of an external exciting coil without the necessity of high current volume in said coil. I propose to employ means within the tube under test to concentrate within the tube walls the flux generated by said coil.

Further objects and advantages of this invention will become apparent in the following detailed description thereof.

In the accompanying drawing, the single figure represents a view, partly sectioned vertically and partly diagrammatic, of a tube testing arrangement embodying my invention.

Referring to the drawing, I have disclosed the essentials of a tube testing arrangement, omitting many of the details and showing only the parts necessary for the disclosure of this invention. Thus, I have shown a tube 10 which is to be tested for defects. The testing operation consists in inducing within the tube 10, flux from a coil 11 which surrounds the tube and is supplied with alternating current from a suitable source such as generator G. Of the flux which is induced by the coil 11, a certain proportion will pass through the walls of tube 10 and the remainder will have an air circuit surrounding the exciting coil 11 and the tube. This flux passes axially through the air spaces in said coil and said tube. Alternating current is induced in the walls of tube 10, circumferentially thereof, and this current will be varied by the presence of defects in the wall of the tube. Such variations in the current induced in tube 10 may be detected by means such as a pair of detector coils 15 and 16 connected in opposition so that normally they are unaffected by changes in quantity of flux due to variations in the current supply. As shown, one of the coils 15 may be made of relatively short longitudinal distance, while the balancing coil 16 may be made of relatively long longitudinal distance whereby a defect may be more accurately located by reason of the short span of the coil 15.

The flux induced in tube 10 sets up eddy currents which then oppose the further introduction of flux into the walls of said tube, and as a consequence the flux tends to take the path of lesser resistance through the air spaces outside of the walls. Since, however, the testing efficiency depends largely upon the concentration of flux within the walls of the tube, it is desirable to utilize the flux which would otherwise be wasted by reason of taking the air circuit path instead of the path through the walls of the tube. Therefore, I propose the following solution of this problem: I propose to insert within the tube a metal slug 20 of a diameter such as substantially to fill the interior of the tube. The slug 20 may be made of metal having low resistance, and therefore flux entering the same will set up large eddy currents which will effectively oppose any further entry of flux into the slug. The flux which heretofore failed to enter the tube but took the easier air circuit therethrough, now meets with even greater resistance by reason of the slug 20 in its path, and therefore the flux is forced into the walls of the tube 10. The slug 20 in order to fulfil the requirements of low resistance and large eddy currents is made of nonferrous metal such as copper and may be provided with an insulating shell 21 surrounding its exterior so that contact between the slug 20 and the tube will not short circuit the flux.

Since a defect in the wall of the tube causes a downward deflection of the flux and this distortion of the flux is picked up by the detector coil 15, it is necessary to provide the metal insert 20 with a circumferential depressed or cut-out portion 30 in the region where it lies in co-operative relation with the detector coil 15. This cut-out portion will permit flux in the tube to be depressed when a flaw occurs, since without such cut-out portions the flux would be confined to the wall of the tube in spite of the presence of the fissure.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for testing tubes, an A. C. exciting means surrounding the tube for generating flux, means responsive to variations in current induced in said tube, and means for concentrating said flux in the walls of said tube, said last named means comprising a metal insert substantially filling the hollow interior of said tube and characterized by low resistance and high eddy current generating properties, said insert having a cutout portion in cooperative relation with said responsive means so as to offer no impediment to deflection of flux in said tube by a defect.

2. In a device for testing tubes, an A. C. exciting means surrounding the tube for generating flux, means responsive to variations in current induced in said tube, and means for concentrating said flux in the walls of said tube, said last named means comprising a non-ferrous metal insert substantially filling the hollow interior of said tube and characterized by low resistance and high eddy current generating properties, said insert having a cutout portion in cooperative relation with said responsive means so as to offer no impediment to deflection of flux in said tube by a defect.

LOREN J. DE LANTY.